United States Patent
Koo et al.

(10) Patent No.: US 8,436,716 B2
(45) Date of Patent: May 7, 2013

(54) METHOD OF UPGRADING AN OPERATION PROGRAM OF A RADIO FREQUENCY IDENTIFICATION SYSTEM

(75) Inventors: Ji hun Koo, Yongin-si (KR); Kyung duck Seo, Yongin-si (KR); Young hoon Min, Anyang-si (KR)

(73) Assignee: Samsung Electronics Co, Ltd., Suwon-Si, Gyeonggi-Do (KR)

( * ) Notice: Subject to any disclaimer, the term of this patent is extended or adjusted under 35 U.S.C. 154(b) by 814 days.

(21) Appl. No.: 12/566,105

(22) Filed: Sep. 24, 2009

(65) Prior Publication Data

US 2010/0079254 A1    Apr. 1, 2010

(30) Foreign Application Priority Data

Sep. 30, 2008 (KR) .................. 10-2008-0095884

(51) Int. Cl.
*H04Q 5/22* (2006.01)
(52) U.S. Cl.
USPC ............. 340/10.1; 340/539.19; 340/572.1; 340/505; 340/501; 340/10.51; 455/95; 455/418; 455/557
(58) Field of Classification Search .............. None
See application file for complete search history.

(56) References Cited

U.S. PATENT DOCUMENTS

| | | | |
|---|---|---|---|
| 6,677,852 B1 * | 1/2004 | Landt | 340/10.1 |
| 2006/0065730 A1 * | 3/2006 | Quan et al. | 235/451 |
| 2006/0229027 A1 | 10/2006 | Wang et al. | |
| 2006/0238305 A1 * | 10/2006 | Loving et al. | 340/10.1 |
| 2008/0104010 A1 * | 5/2008 | Subramanian et al. | 707/1 |
| 2008/0297312 A1 * | 12/2008 | Moshfeghi | 340/10.1 |
| 2011/0143661 A1 * | 6/2011 | Hartwig et al. | 455/41.1 |
| 2011/0148570 A1 * | 6/2011 | Weidinger | 340/5.8 |

FOREIGN PATENT DOCUMENTS

| | | |
|---|---|---|
| JP | 2005-215796 | 8/2005 |
| JP | 2006-190180 | 7/2006 |
| JP | 2006-338219 | 12/2006 |

* cited by examiner

*Primary Examiner* — Benjamin C Lee
*Assistant Examiner* — Curtis King
(74) *Attorney, Agent, or Firm* — F. Chau & Associates, LLC (57) ABSTRACT

A method of upgrading an operation program in an interrogator of a radio frequency identification (RFID) system including the interrogator and a transponder is provided. The method includes transmitting, from the interrogator to the transponder, a first message requesting an operation program upgrade based on information exchanged between the interrogator and the transponder; receiving, at the interrogator from the transponder, a second message that includes a new-version operation program in response to the first message; and installing, at the interrogator, the new-version operation program to upgrade the operation program in the interrogator.

19 Claims, 9 Drawing Sheets

| Preamble | Command | Memory position info | Size | Handle | CRC | End of Signal |

METHOD OF UPGRADING AN OPERATION PROGRAM OF A RADIO FREQUENCY IDENTIFICATION SYSTEM

CROSS-REFERENCE TO RELATED APPLICATION

This application claims priority under 35 U.S.C. §119 to Korean Patent Application No. 10-2008-0095884 filed on Sep. 30, 2008, in the Korean Intellectual Property Office, the disclosure of which is incorporated by reference herein in its entirety.

BACKGROUND

1. Technical Field

The present inventive concept relates to radio frequency identification (RFID) technology, and more particularly, to a method of upgrading an old-version operation program stored in an RFID interrogator with a new-version operation program.

2. Discussion of the Related Art

RFID is the use of an object applied to or incorporated into a product, animal or person for the purpose of identification and tracking using radio waves, for example. RFID is becoming increasingly prevalent as the price of the technology decreases. For example, RFID is used in various fields such as traffic management, security (ID cards, passports), identification and/or tracking within a facility, inventory management, and mobile payment.

An RFID system generally includes an interrogator (sometimes called a "reader" or "scanner") and a transponder (sometimes called a "tag" or "card"). In the RFID system, there is a dialogue in which the transponder provides data—usually its unique identification and possibly additional data—to the interrogator using an air-interface protocol.

An RFID system, which has been installed in the field for a particular purpose, may need to be replaced so that it can support another air-interface protocol, recognize a different kind of transponder, or because a bug revision is required. It is inexpensive to replace a transponder; however, replacing an interrogator is costly.

Accordingly, there exists a need to reduce the cost of replacing an RFID interrogator.

SUMMARY

Exemplary embodiments of the present inventive concept provide methods of upgrading an old-version operation program stored in a radio frequency identification (RFID) interrogator with a new-version operation program, which can perform a new or upgraded function, so that the interrogator does not have to be replaced.

According to an exemplary embodiment of the present inventive concept, there is provided a method of upgrading an operation program in an interrogator of an RFID system including the interrogator and a transponder. The method includes transmitting, from the interrogator to the transponder, a first message requesting an operation program upgrade based on information exchanged between the interrogator and the transponder; receiving, at the interrogator from the transponder, a second message that includes a new-version operation program in response to the first message; and installing, at the interrogator, the new-version operation program to upgrade the operation program in the interrogator.

The method may further include performing, at the interrogator, a transponder anti-collision algorithm to prevent radio waves from a plurality of transponders, which are further included in the RFID system, from colliding with each other.

The first message may include a field indicating a type of command, a field indicating a position of memory at which the command is executed, a field indicating a size of data receivable by the interrogator, a field designating a transponder to execute the command, or a field for verifying the reliability of data communication. The second message may include a field indicating whether a command in the first message has been executed normally, a field indicating a memory address at which data transmitted in the second message has been stored or an error code, a field indicating an interrogator to receive the data, or a field for verifying the reliability of data communication.

The method may further include determining that the operation program upgrade is needed based on the information exchanged between the interrogator and the transponder, using the interrogator or the transponder.

The information exchanged between the interrogator and the transponder may include version information of the operation program stored in each of the interrogator and the transponder, a start address of a memory of each of the interrogator and the transponder, or a size of the operation program stored in each of the interrogator and the transponder.

The method may further include repeating transmitting the first message, receiving the second message and installing the new-version operation program at least one time depending on a size of data transferable in the RFID system and a size of the new-version operation program.

The method may further include calculating a checksum for the new-version operation program, using the interrogator; and comparing the calculated checksum with a checksum received from the transponder and verifying the reliability of the reception of the new-version operation program based on a result of the comparison, using the interrogator.

The method may further include resetting an address indicated by a program counter to a start address of a memory of the interrogator in which the new-version operation program has been stored, using the interrogator.

According to an exemplary embodiment of the present inventive concept, there is provided a computer program product for upgrading an operation program in an RFID interrogator. The computer program product includes a computer readable recording medium having computer readable code embodied therewith, the computer readable code including computer readable code configured to cause the RFID interrogator to determine that its operation program needs to be upgraded; computer readable code configured to cause the RFID interrogator to authenticate a new-version operation program provided to the RFID interrogator; and computer readable code configured to cause the RFID interrogator to install the new-version operation program in its memory to upgrade the RFID interrogator's operation program.

The computer readable code configured to cause the RFID interrogator to determine that its operation program needs to be upgraded further includes computer readable code configured to cause the RFID interrogator to transmit its authentication information and operation program information in response to a request for the authentication information and operation program information.

The computer program product may be included in a mobile device including the RFID interrogator.

The computer readable code further includes computer readable code configured to cause the RFID interrogator to execute a transponder anti-collision algorithm to allow the RFID interrogator to exchange information with an RFID transponder of a plurality of RFID transponders without interference from other RFID transponders.

The computer readable code configured to cause the RFID interrogator to determine that its operation program needs to be upgraded further comprises computer readable code configured to cause the RFID interrogator to determine that the operation program upgrade is needed based on information exchanged with an RFID transponder.

The information exchanged with the RFID transponder may include version information of the operation program stored in the RFID interrogator and version information of an operation program stored in the RFID transponder, a memory start address of each of the RFID interrogator and the RFID transponder, or a size of the operation program stored in each of the RFID interrogator and the RFID transponder.

The computer readable code further includes computer readable code configured to cause the RFID interrogator to continue to receive individual messages that contain segments of the new-version operation program until the new-version operation program has been received in its entirety.

The computer readable code configured to cause the RFID interrogator to authenticate a new-version operation program provided to the RFID interrogator further includes: computer readable code configured to cause the RFID interrogator to calculate a checksum for the new-version operation program; and computer readable code configured to cause the RFID interrogator to compare the calculated checksum with a checksum of an RFID transponder and verify the receipt of the new-version operation program based on a result of the comparison.

The computer readable code configured to cause the RFID interrogator to install the new-version operation program in its memory further includes computer readable code configured to cause the RFID interrogator to reset an address indicated by a program counter to a start address of the memory of the RFID interrogator in which the new-version operation program has been stored.

According to an exemplary embodiment of the present inventive concept, there is provided a method of upgrading an operation program in an interrogator of an RFID system including the interrogator and a plurality of transponders. The method includes performing, at the interrogator, a transponder anti-collision algorithm so that the interrogator can communicate with one transponder at a time; providing, from the interrogator, operation program information of the interrogator to a first transponder, or providing, from the first transponder, operation program information of the first transponder to the interrogator; determining, at the interrogator or the first transponder depending on which was provided with the operation program information, that an operation program of the interrogator needs to be upgraded; sending, from the interrogator to the first transponder, a request for an operation program upgrade; receiving, at the interrogator from the first transponder, a new-version operation program in response to the request for an operation program upgrade; calculating a checksum for the new-version operation program, using the interrogator; comparing the calculated checksum with a checksum received from the first transponder and verifying the reliability of the reception of the new-version operation program based on a result of the comparison, using the interrogator; and resetting an address indicated by a program counter to a start address of a memory of the interrogator in which the new-version operation program has been stored, using the interrogator, so that the interrogator can perform a new or upgraded function included in the new-version operation program.

BRIEF DESCRIPTION OF THE DRAWINGS

The above and other features of the present inventive concept will become more apparent by describing in detail exemplary embodiments thereof with reference to the attached drawings in which.

DETAILED DESCRIPTION OF THE EMBODIMENTS

Exemplary embodiments of the present inventive concept are described more fully hereinafter with reference to the accompanying drawings. This inventive concept may, however, be embodied in many different forms and should not be construed as limited to the exemplary embodiments set forth herein. Like numbers refer to like elements throughout the drawings.

It will be understood that when an element is referred to as being "connected" or "coupled" to another element, it can be directly connected or coupled to the other element or intervening elements may be present.

Figure 1:
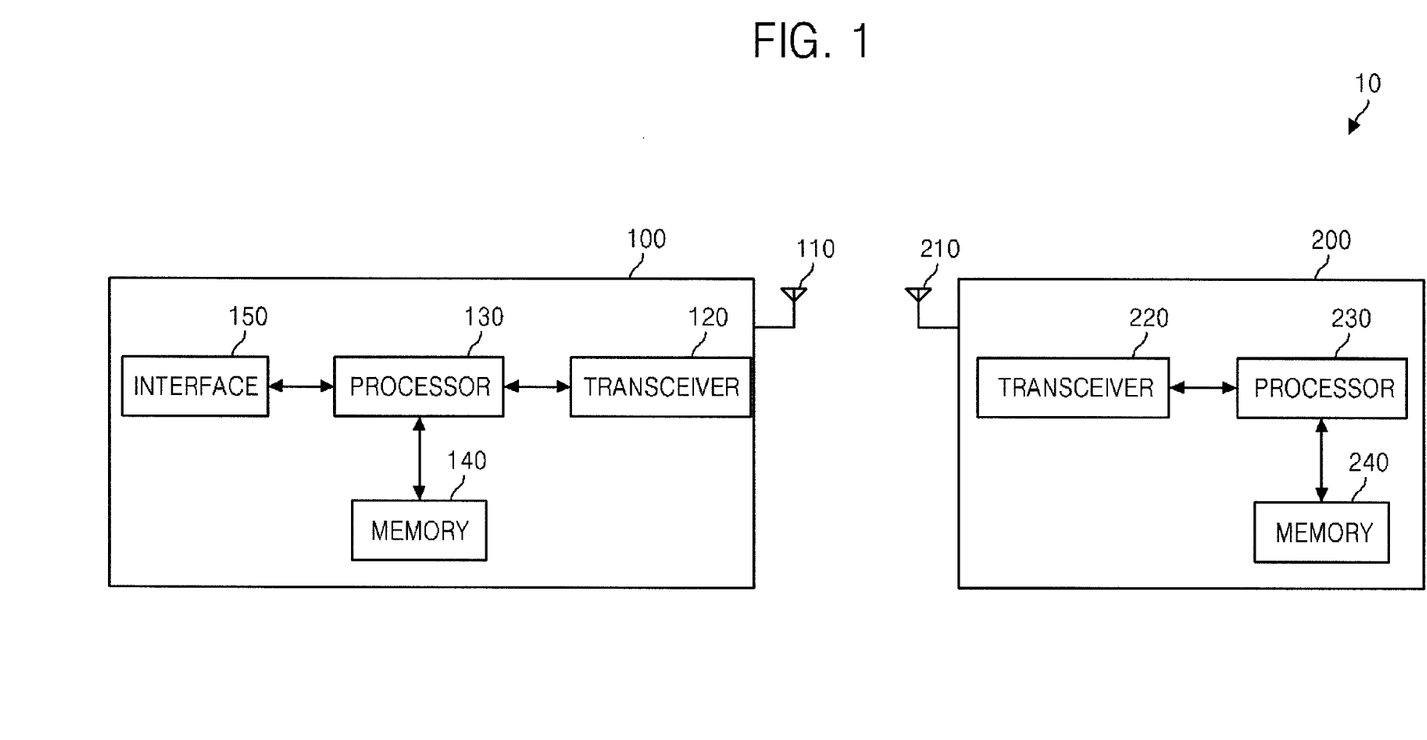
FIG. 1 is a block diagram of a radio frequency identification (RFID) system according to an exemplary embodiment of the present inventive concept.

FIG. 1 is a block diagram of a radio frequency identification (RFID) system 10 according to an exemplary embodiment of the present inventive concept. The RFID system 10 includes an interrogator 100 and a transponder 200. The interrogator 100 includes an antenna 110, a transceiver 120, a processor 130, a memory 140, and an interface 150.

The transceiver 120 converts a radio frequency (RF) signal received through the antenna 110 into a signal that can be used within the interrogator 100. The transceiver 120 also converts a signal generated in the interrogator 100 into an RF signal and transmits the RF signal to the transponder 200 through the antenna 110.

The processor 130 processes data received through the transceiver 120 and data received from a host (e.g., a computer) through the interface 150 and controls the operation of the interrogator 100. The memory 140 stores operation program information including an operation program of the RFID system 10, version information of the operation program, a start address of the memory 140 and various commands for communication of data with the transponder 200. The start address is an address of the memory 140 in which the operation program is stored.

The transponder 200 includes an antenna 210, a transceiver 220, a processor 230, and a memory 240. The transceiver 220 converts an RF signal received through the antenna 210 into a signal that can be used within the transponder 200. The transceiver 220 also converts a signal generated in the transponder 200 into an RF signal and transmits the RF signal to the interrogator 100 through the antenna 210.

The processor 230 processes data received through the transceiver 220 and controls the operation of the transponder 200. The memory 240 may store operation program information including a new-version operation program of the RFID system 10, version information of the new-version operation program, a start address of the memory 240, a checksum, the size of the new-version operation program and various commands for communication of data with the interrogator 100. The operation program may be divided into at least one segment when it is stored, thereby facilitating the communication of data with the interrogator 100.

Figure 2:
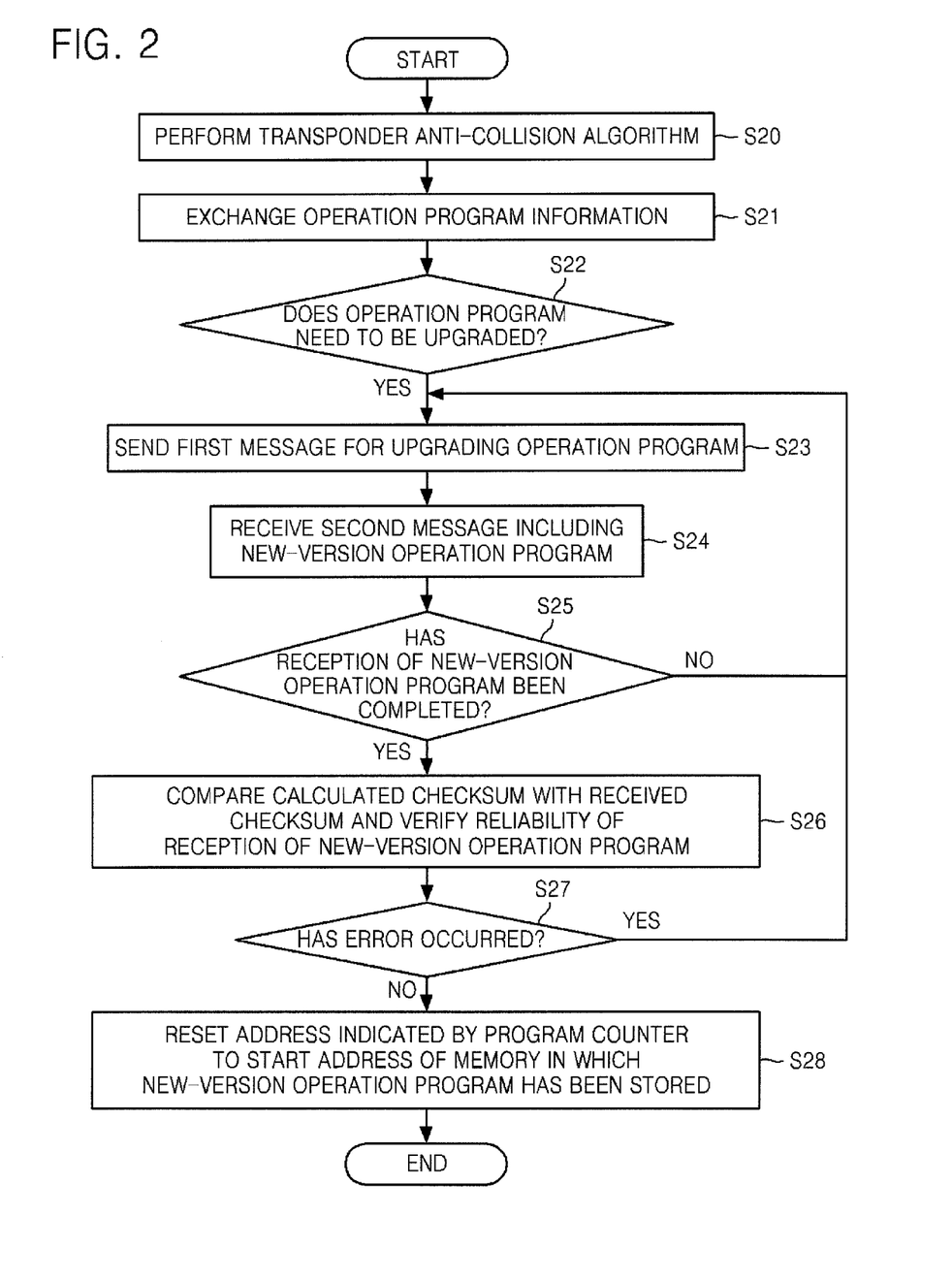
FIG. 2 is a flowchart of a method of upgrading an operation program in the RFID system illustrated in FIG. 1 according to an exemplary embodiment of the present inventive concept.

FIG. 2 is a flowchart of a method of upgrading an operation program in the RFID system 10 illustrated in FIG. 1 according to an exemplary embodiment of the present inventive concept. An exemplary embodiment of the method of upgrading the operation program in the RFID system 10, which allows the RFID system 10 to perform a new or upgraded function without replacing the interrogator 100, will now be described with reference to FIGS. 1 and 2.

When a plurality of transponders 200 responding to the interrogator 100 exist, the RFID system 10 performs a transponder anti-collision algorithm to prevent radio waves between the multiple transponders 200 and the interrogator 100 from colliding with each other when the multiple transponders 200 communicate with the interrogator 100 in operation S20. Examples of the transponder anti-collision algorithm include a binary tree algorithm and an Aloha algorithm, both of which have been adopted as international standards.

After completion of the transponder anti-collision algorithm, the interrogator 100 and the transponder 200 exchange information in operation S21. The information may include the version information of the operation program stored in each of the interrogator 100 and the transponder 200, the memory start addresses, and the size of the operation program stored in each of the interrogator 100 and the transponder 200.

Next, the interrogator 100 or the transponder 200 determines whether the operation program stored in the interrogator 100 needs to be upgraded based on the exchanged information in operation S22. When the upgrade of the operation program is necessary, the interrogator 100 sends a first message for upgrading the operation program to the transponder 200 in operation S23, otherwise the method of upgrading the operation program ends.

Figure 3:
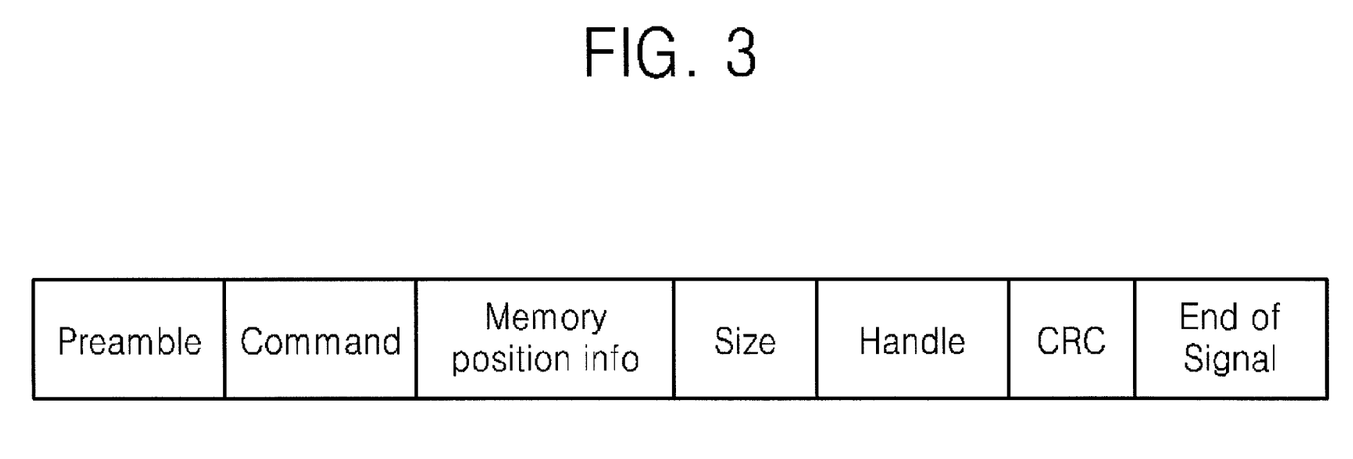
FIG. 3 illustrates the format of a first message sent from an interrogator to a transponder in the RFID system illustrated in FIG. 1 according to an exemplary embodiment of the present inventive concept.

FIG. 3 illustrates the format of a first message sent from the interrogator 100 to the transponder 200 in the RFID system 10 illustrated in FIG. 1 according to an exemplary embodiment of the present inventive concept. Referring to FIG. 3, the first message includes a command field indicating a type of command, a memory position info field indicating memory position information used to execute the command, a size field indicating the size of data receivable by the interrogator 100, a handle field designating a transponder to execute the command, and a cyclic redundancy check (CRC) field for verification of the reliability of data communication. A preamble field indicates the start of the first message and an end-of-signal field indicates the end of the first message.

The format of the first message will be described in detail with reference to FIGS. 1 and 3. For instance, the command field may have a value of 0x00 to indicate a read command and a value of 0x01 to indicate a write command. The memory position info field may include information about a position (e.g., a memory bank, a start address, and a position of a segment), at which a read or write operation will be performed in the memory 240 of the transponder 200 according to the type of command.

The size field indicates the size of data that the interrogator 100 can receive from the transponder 200. For instance, the size field having a value of 0x00 may indicate that the interrogator 100 receives all data in the memory bank of the transponder 200.

The handle field designates one transponder 200 to execute the command when there are multiple transponders 200 in a working relationship with the interrogator 100. For instance, the handle field may include a code shared between the transponder 200 and the interrogator 100, which is used for transponder anti-collision, or identification (ID) of the transponder 200. The CRC field may indicate a CRC calculated from the command field, the memory position info field, the size field, and the handle field.

Figure 4:
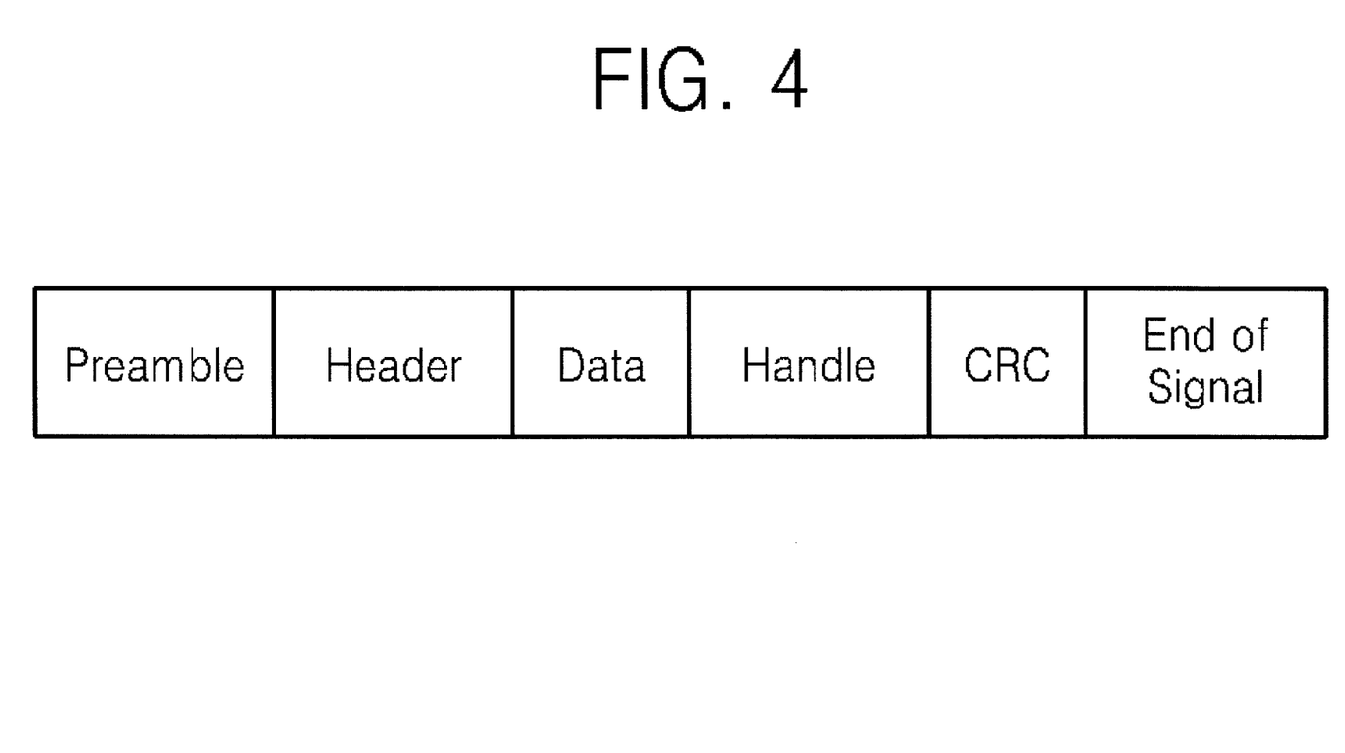
FIG. 4 illustrates the format of a second message sent from the transponder to the interrogator in the RFID system illustrated in FIG. 1 according to an exemplary embodiment of the present inventive concept.

The interrogator 100 receives a second message from the transponder 200 in response to the first message in operation S24. The second message may include all or part of a new-version operation program. FIG. 4 illustrates the format of the second message sent from the transponder 200 to the interrogator 100 in the RFID system 10 illustrated in FIG. 1 according to an exemplary embodiment of the present inventive concept.

Referring to FIG. 4, the second message includes a header field indicating whether the command has been executed normally, a data field indicating a memory address at which data transmitted in the second message has been stored or an error code, a handle field indicating the interrogator 100 to receive the data, and a CRC field for verification of the reliability of data communication. A preamble field indicates the start of the second message and an end-of-signal field indicates the end of the second message.

For instance, the header field having a value of 0x00 may indicate that the command has been executed normally. The data field may be a result of a read operation, e.g., a memory value corresponding to all or part of the new-version operation program. When the header field has a value of 0x01 indicating that the command has not been executed normally, the data field may include an error code in accordance with a predetermined protocol. For example, Table 1 shows error codes that may be used in an RFID system in accordance with the International Organization for Standardization/International Electrotechnical Commission (ISO/IEC) 18000-6 type C.

TABLE 1

| Error-Code Support | Error Code | Error-Code Name | Error Description |
|---|---|---|---|
| Error-specific | 00000000 | Other error | Catch-all for errors not covered by other codes |
| | 00000011 | Memory overrun or unsupported PC value | The specified memory location does not exist |
| | 00000100 | Memory locked | The specified memory location is locked by password |
| | 00001011 | Insufficient power | The tag has insufficient power to perform the memory-write operation |
| Non-specific | 00001111 | Non-specific error | The tag does not support error-specific codes |

After receiving the second message, the interrogator 100 determines whether the reception of the new-version operation program from the transponder 200 has been completed in operation S25. When the reception of the new-version operation program has not been completed, operations S23 and S24 are repeated. This indicates that the new-version operation program may need to be divided into a plurality of segments for transmission due to the size of data transferable in the RFID system 10 and the size of the new-version operation program.

When the reception of the new-version operation program has been completed, the interrogator 100 calculates a checksum for the new-version operation program, compares the calculated checksum with a checksum received from the transponder 200, and verifies the reliability of the reception of the new-version operation program based on a result of the comparison in operation S26 and determines whether an error has occurred during the reception of the new-version operation program in operation S27.

When the error has occurred during the reception of the new-version operation program, the RFID system 10 repeats operations S23 through S26, otherwise the interrogator 100 of the RFID system 10 resets an address indicated by a program counter to a start address of the memory 140 in which the new-version operation program has been stored in operation S28. Then, the RFID system 10 can perform the new or upgraded function included in the new-version operation program.

Figure 5:
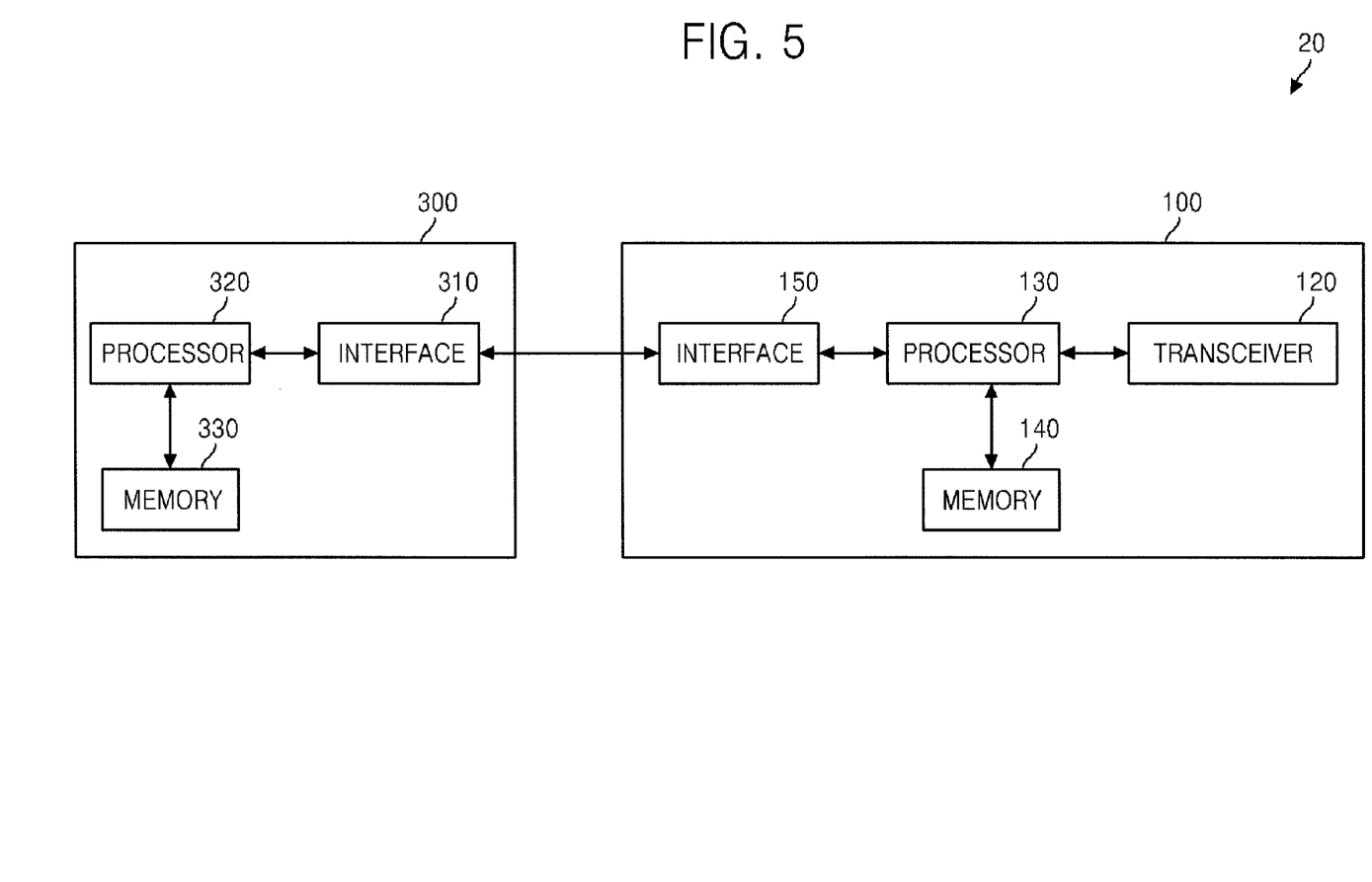
FIG. 5 is a block diagram of an RFID system according to an exemplary embodiment of the present inventive concept.

FIG. 5 is a block diagram of an RFID system 20 according to an exemplary embodiment of the present inventive concept. The RFID system 20 upgrades an operation program stored in the interrogator 100 with a new-version operation program using a host 300. Referring to FIG. 5, the RFID system 20 includes the interrogator 100 and the host 300.

The interrogator 100 illustrated in FIG. 5 has the same structure and functions as the interrogator 100 illustrated in FIG. 1 with the exception that the interrogator 100 illustrated in FIG. 5 receives the new-version operation program from the host 300 through the interface 150. Thus, a detailed description thereof will be omitted.

The host 300 includes an interface 310, a processor 320, and a memory 330. The interface 310 may be implemented by a universal asynchronous receiver transmitter (UART), a serial peripheral interface (SPI), or an internal-integrated circuit (12C), but the present inventive concept is not limited thereto. The processor 320 controls the overall operations of the host 300, including data communication with the interrogator 100.

The memory 330 may store operation program information including a new-version operation program of the RFID system 20, version information of the new-version operation program, a start address of the memory 330, a checksum, the size of the new-version operation program and various commands for communication of data with the interrogator 100. The new-version operation program may be divided into at least one segment when it is stored, thereby facilitating the communication of data with the interrogator 100.

Figure 6:
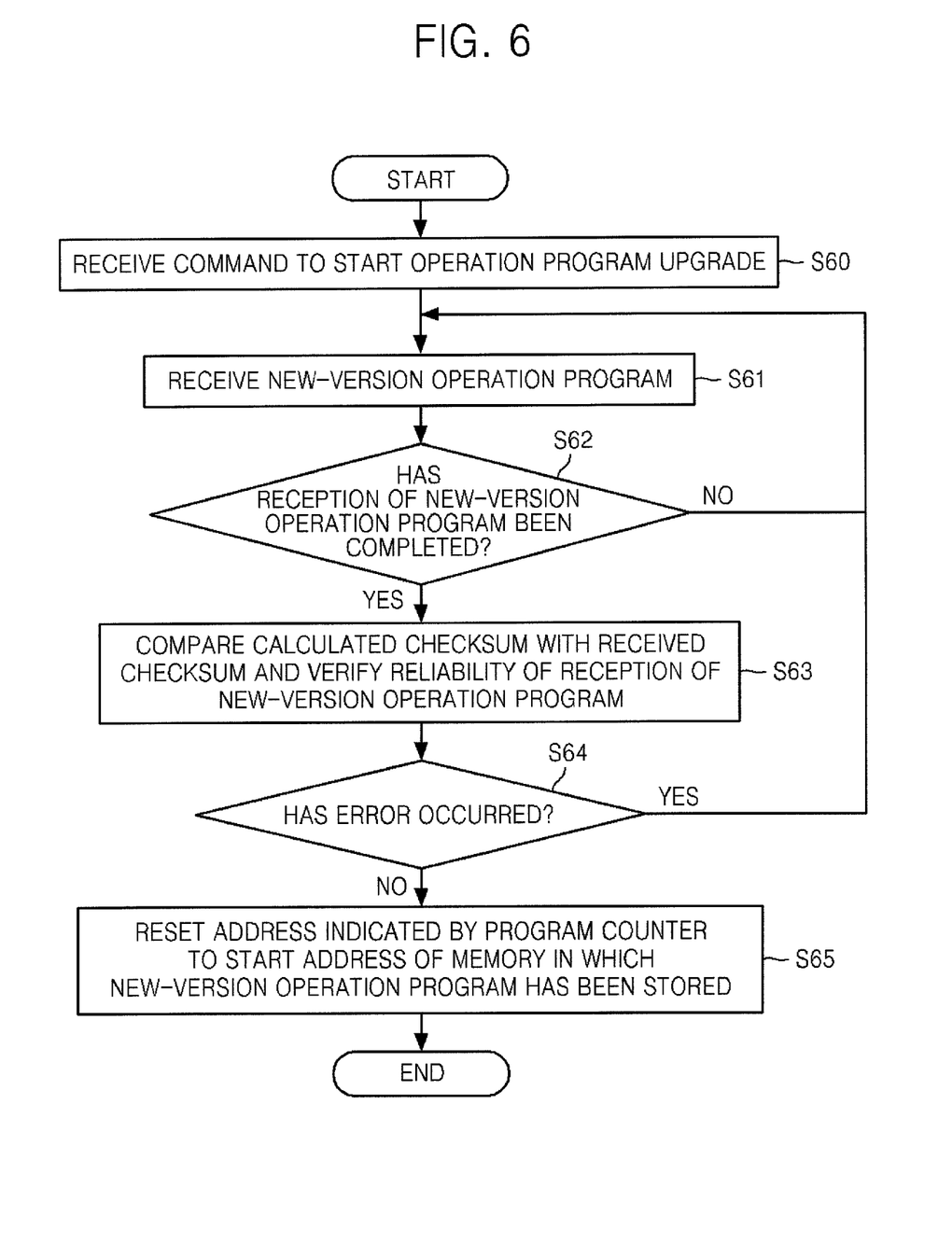
FIG. 6 is a flowchart of a method of upgrading an operation program in the RFID system illustrated in FIG. 5 according to an exemplary embodiment of the present inventive concept.

FIG. 6 is a flowchart of a method of upgrading an operation program in the RFID system 20 illustrated in FIG. 5 according to an exemplary embodiment of the present inventive concept. Referring to FIGS. 5 and 6, the interrogator 100 receives a command to start upgrading the current operation program with a new-version operation program from the host 300 in operation S60 and starts receiving the new-version operation program in operation S61.

Figure 7:
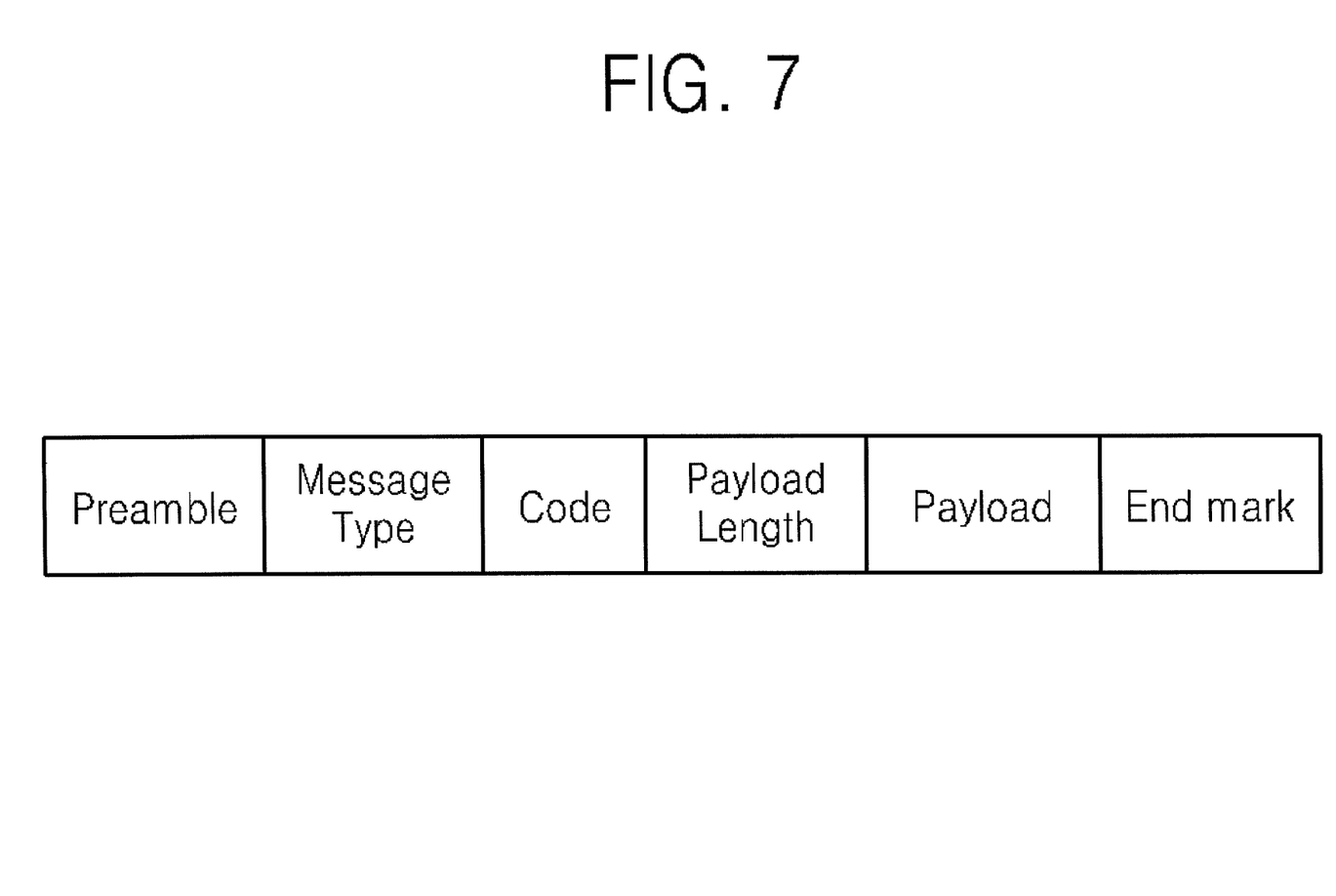
FIG. 7 illustrates the format of a message transferred between a host and an interrogator in the RFID system illustrated in FIG. 5 according to an exemplary embodiment of the present inventive concept.

FIG. 7 illustrates the format of a message transferred between the host 300 and the interrogator 100 in the RFID system 20 illustrated in FIG. 5 according to an exemplary embodiment of the present inventive concept. Referring to FIG. 7, the message includes a preamble, a message type, a code, a payload length, a payload, and an end mark.

The preamble indicates the start of the message. The message type indicates whether the message is originated from the host 300 or the interrogator 100. The code indicates a command by the host 300, such as an upgrade command, an upgrade start command, or an upgrade end command or a reply of the interrogator 100 to the command of the host 300. The payload length indicates the size of a payload. The payload indicates data transmitted in the message. The end mark indicates the end of the message.

The interrogator 100 determines whether the reception of the new-version operation program has been completed in operation S62. When the reception of the new-version operation program has not been completed, operations S61 and S62 are repeated. When the reception of the new-version operation program has been completed, the interrogator 100 calculates a checksum for the new-version operation program, compares the calculated checksum with a checksum received from the host 300, and verifies the reliability of the reception of the new-version operation program based on a result of the comparison in operation S63 and determines whether an error has occurred during the reception of the new-version operation program in operation S64.

When the error has occurred during the reception of the new-version operation program, the RFID system 20 repeats operations S61 through S63, otherwise the interrogator 100 of the RFID system 20 resets an address indicated by a program counter to a start address of the memory 140 in which the new-version operation program has been stored in operation S65. Then, the RFID system 20 can perform the new or upgraded function included in the new-version operation program.

Figure 8:
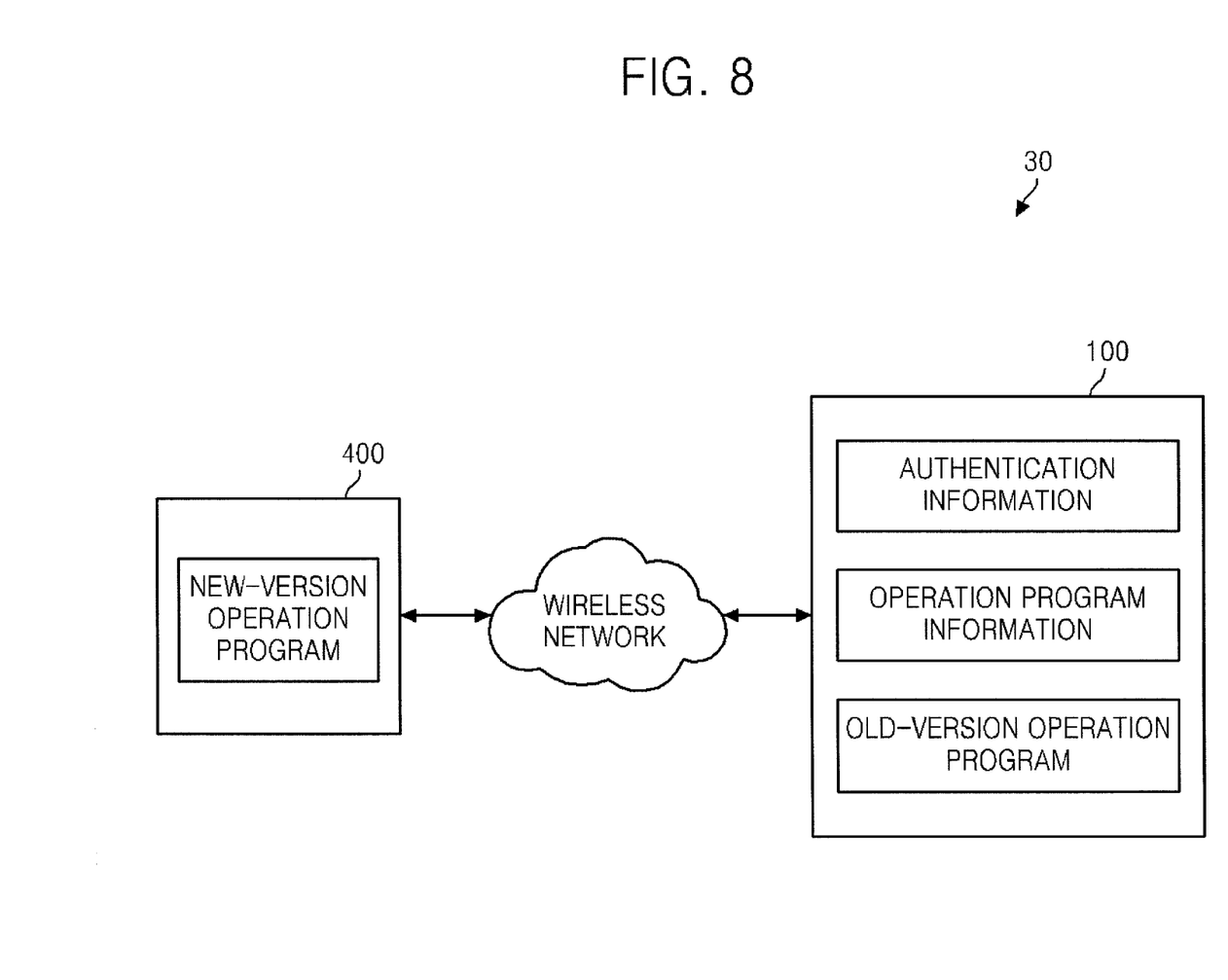
FIG. 8 is a block diagram of an RFID system according to an exemplary embodiment of the present inventive concept.

FIG. 8 is a block diagram of an RFID system 30 according to an exemplary embodiment of the present inventive concept. Referring to FIG. 8, the RFID system 30 includes the interrogator 100 and a server 400. The server 400 stores a new-version operation program. The interrogator 100 stores authentication information, operation program information, and an old-version operation program. The interrogator 100 may upgrade the old-version operation program stored therein with the new-version operation program received from the server 400 through a wireless network.

Figure 9:
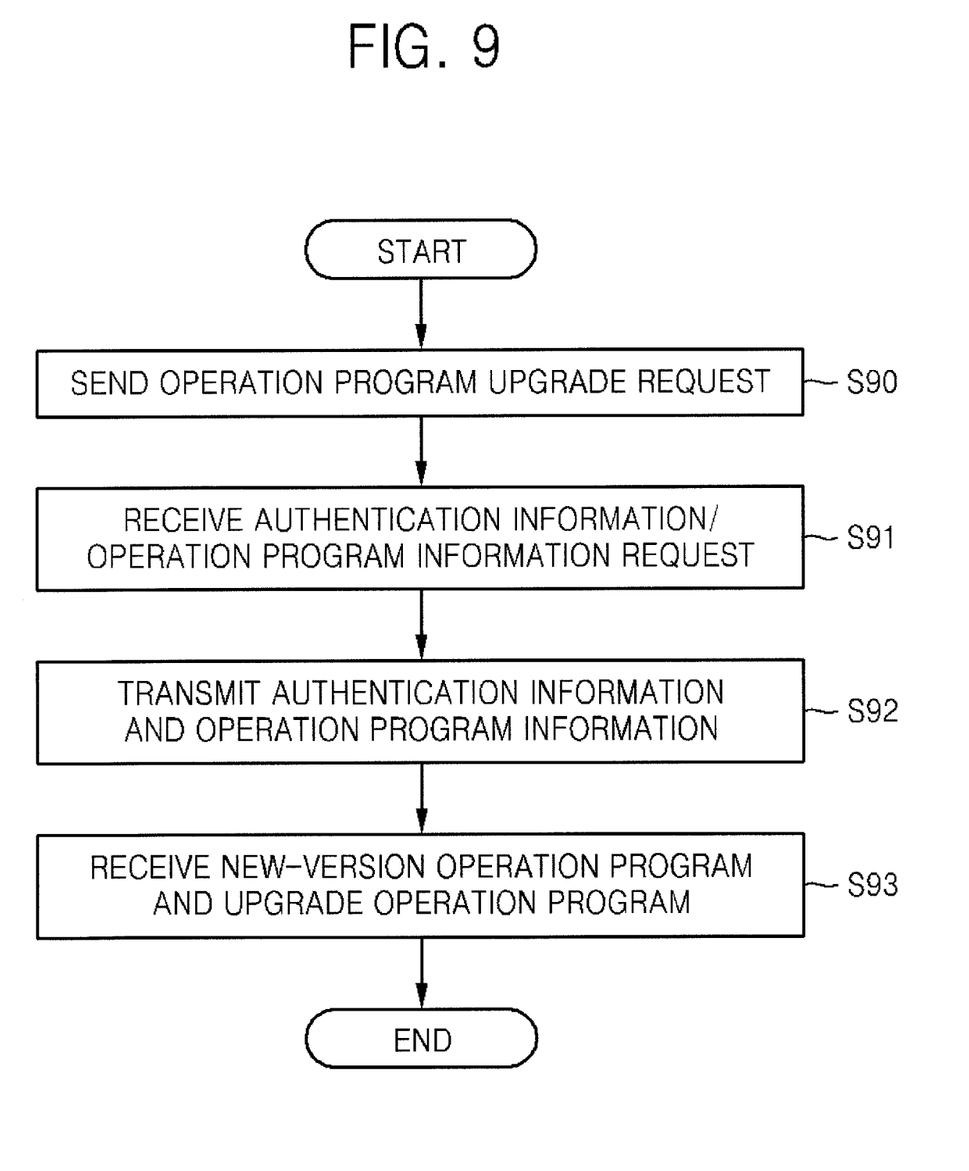
FIG. 9 is a flowchart of a method of upgrading an operation program in the RFID system illustrated in FIG. 8 according to an exemplary embodiment of the present inventive concept.

FIG. 9 is a flowchart of a method of upgrading an operation program in the RFID system 30 illustrated in FIG. 8 according to an exemplary embodiment of the present inventive concept. Referring to FIGS. 8 and 9, the interrogator 100 sends an operation program upgrade request to the server 400 in operation S90. The interrogator 100 receives an authentication information/operation program information request sent from the server 400 in response to the operation program upgrade request in operation S91.

The interrogator 100 transmits the authentication information and the operation program information stored in a memory (not shown) to the server 400 in response to the authentication information/operation program information request in operation S92. The interrogator 100 receives the new-version operation program transmitted from the server 400 in response to the authentication information and the operation program information sent from the interrogator 100 and upgrades the old-version operation program with the new-version operation program in operation S93.

This method of upgrading an operation program in the RFID system 30 may be used to upgrade a mobile device including the interrogator 100. Examples of the mobile device include a cellular phone, a personal digital assistant (PDA), or a portable multimedia player (PMP).

Exemplary embodiments of the present inventive concept can also take the form of a computer program product embodied in one or more computer readable recording medium(s) having computer readable codes embodied thereon. The computer readable recording medium may be any data storage device that can store data which can be thereafter read by a computer system. Examples of the computer readable recording medium include a read-only memory (ROM), a random-access memory (RAM), a portable compact disk read-only memory CD-ROM, a magnetic storage device, a portable computer diskette, and an optical storage device.

The computer readable recording medium can also be distributed over a network of coupled computer systems so that the computer readable code is stored and executed in a distributed fashion. In addition, functional programs, codes, and code segments for accomplishing the present inventive concept can be written in any combination of one or more programming languages.

As described above, according to exemplary embodiments of the present inventive concept, when an RFID system needs to perform a new or upgraded function, an old-version operation program stored in an interrogator can be upgraded with a new-version operation program stored in a transponder, host or server so that the RFID system can perform the new function without replacing the interrogator.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims.

What is claimed is:

1. A method of upgrading an operation program in an interrogator of a radio frequency identification (RFID) system including the interrogator and a transponder, the method comprising:

transmitting, from the interrogator to a transponder, a first message requesting an operation program upgrade based on information exchanged between the interrogator and the transponder, wherein the first message comprises a field indicating a type of command, a field indicating a position of memory at which the command is executed, a field indicating a size of data receivable by the interrogator, a field designating the transponder to execute the command, and a field for verifying the reliability of data communication;

receiving, at the interrogator from the transponder, a second message that includes a new-version operation program in response to the first message; and installing, at the interrogator, the new-version operation program to upgrade the operation program in the interrogator.

2. The method of claim 1, further comprising performing, at the interrogator, a transponder anti-collision algorithm to prevent radio waves from a plurality of transponders, which are further included in the RFID system, from colliding with each other.

3. The method of claim 1, wherein the second message comprises a field indicating whether the command in the first message has been executed normally, a field indicating a memory address at which data transmitted in the second message has been stored or an error code, a field indicating the interrogator to receive the data, or a field for verifying the reliability of data communication.

4. The method of claim 1, further comprising determining that the operation program upgrade is needed based on the information exchanged between the interrogator and the transponder, using the interrogator or the transponder.

5. The method of claim 4, wherein the information exchanged between the interrogator and the transponder comprises version information of the operation program stored in each of the interrogator and the transponder, a start address of a memory of each of the interrogator and the transponder, or a size of the operation program stored in each of the interrogator and the transponder.

6. The method of claim 4, further comprising repeating transmitting the first message, receiving the second message and installing the new-version operation program at least one time depending on a size of data transferable in the RFID system and a size of the new-version operation program.

7. The method of claim 1, further comprising:

calculating a checksum for the new-version operation program, using the interrogator; and comparing the calculated checksum with a checksum received from the transponder and verifying the reliability of the reception of the new-version operation program based on a result of the comparison, using the interrogator.

8. The method of claim 7, further comprising resetting an address indicated by a program counter to a start address of a memory of the interrogator in which the new-version operation program has been stored, using the interrogator.

9. A computer program product for upgrading an operation program in a radio frequency identification (RFID) interrogator, the computer program product comprising:

a non-transitory computer readable recording medium having computer readable code embodied therewith, the computer readable code comprising:

computer readable code configured to cause the RFID interrogator to determine that its operation program needs to be upgraded;

computer readable code configured to cause the RFID interrogator to send a message to an RFID transponder, based on the determination that its operation program needs to be upgraded, the message including a field indicating a type of command, a field indicating a position of memory at which the command is executed, a field indicating a size of data receivable by the interrogator, a field designating the transponder to execute the command, and a field for verifying the reliability of data communication;

computer readable code configured to cause the RFID interrogator to authenticate a new-version operation program provided to the RFID interrogator by the RFID transponder in response to the message; and computer readable code configured to cause the RFID interrogator to install the new-version operation program in its memory to upgrade the RFID interrogator's operation program.

10. The computer program product of claim 9, wherein the computer readable code configured to cause the RFID interrogator to determine that its operation program needs to be upgraded further comprises computer readable code configured to cause the RFID interrogator to transmit its authentication information and operation program information in response to a request for the authentication information and operation program information.

11. The computer program product of claim 10, wherein the computer program product is included in a mobile device comprising the RFID interrogator.

12. The computer program product of claim 9, wherein the computer readable code further comprises computer readable code configured to cause the RFID interrogator to execute a transponder anti-collision algorithm to allow the RFID interrogator to exchange information with the RFID transponder of a plurality of RFID transponders without interference from other RFID transponders.

13. The computer program product of claim 9, wherein the computer readable code configured to cause the RFID interrogator to determine that its operation program needs to be upgraded further comprises computer readable code configured to cause the RFID interrogator to determine that the operation program upgrade is needed based on information exchanged with the RFID transponder.

14. The computer program product of claim 13, wherein the information exchanged with the RFID transponder comprises version information of the operation program stored in the RFID interrogator and version information of an operation program stored in the RFID transponder, a memory start address of each of the RFID interrogator and the RFID transponder, or a size of the operation program stored in each of the RFID interrogator and the RFID transponder.

15. The computer program product of claim 9, wherein the computer readable code further comprises computer readable code configured to cause the RFID interrogator to continue to receive individual messages that contain segments of the new-version operation program until the new-version operation program has been received in its entirety.

16. The computer program product of claim 9, wherein the computer readable code configured to cause the RFID interrogator to authenticate a new-version operation program provided to the RFID interrogator further comprises:

computer readable code configured to cause the RFID interrogator to calculate a checksum for the new-version operation program; and computer readable code configured to cause the RFID interrogator to compare the calculated checksum with a checksum of the RFID transponder and verify the receipt of the new-version operation program based on a result of the comparison.

17. The computer program product of claim 16, wherein the computer readable code configured to cause the RFID interrogator to install the new-version operation program in its memory further comprises computer readable code configured to cause the RFID interrogator to reset an address indicated by a program counter to a start address of the memory of the RFID interrogator in which the new-version operation program has been stored.

18. A method of upgrading an operation program in an interrogator of a radio frequency identification (RFID) system including the interrogator and a plurality of transponders, the method comprising:

performing, at the interrogator, a transponder anti-collision algorithm so that the interrogator can communicate with one transponder at a time;

providing, from the interrogator, operation program information of the interrogator to a first transponder, or providing, from the first transponder, operation program information of the first transponder to the interrogator;

determining, at the interrogator or the first transponder depending on which was provided with the operation program information, that an operation program of the interrogator needs to be upgraded;

sending, from the interrogator to the first transponder, a request for an operation program upgrade, wherein the request comprises a field indicating a type of command, a field indicating a position of memory at which the command is executed, a field indicating a size of data receivable by the interrogator, a field designating the first transponder to execute the command, and a field for verifying the reliability of data communication;

receiving, at the interrogator from the first transponder, a new-version operation program in response to the request for an operation program upgrade;

calculating a checksum for the new-version operation program, using the interrogator;

comparing the calculated checksum with a checksum received from the first transponder and verifying the reliability of the reception of the new-version operation program based on a result of the comparison, using the interrogator; and resetting an address indicated by a program counter to a start address of a memory of the interrogator in which the new-version operation program has been stored, using the interrogator.

19. The method of claim 18, wherein the interrogator can perform a new or upgraded function included in the new-version operation program.

* * * * *